US006320907B1

United States Patent
Pau et al.

(10) Patent No.: US 6,320,907 B1
(45) Date of Patent: Nov. 20, 2001

(54) ADAPTIVE TREE-SEARCH VECTOR QUANTIZATION IN MPEG2 DECODER

(75) Inventors: Danilo Pau, Sesto San Giovanni; Roberta Bruni, Seregno, both of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/195,800

(22) Filed: Nov. 19, 1998

(30) Foreign Application Priority Data

Nov. 24, 1997 (EP) .................................................. 97830618

(51) Int. Cl.[7] ....................................................... H04B 1/66

(52) U.S. Cl. ................................. 375/240.22; 375/240.03; 382/253

(58) Field of Search .......................... 375/240.02, 240.03, 375/240.18, 240.22, 240.04; 341/51, 79; 382/253, 239, 232, 236; 348/414.01, 417.1, 418.1, 415.1, 400–402.1, 405.1, 409.1, 453, 459

(56) References Cited

U.S. PATENT DOCUMENTS

| 4,727,354 |   | 2/1988  | Lindsay .        |           |
|-----------|---|---------|------------------|-----------|
| 4,811,112 |   | 3/1989  | Rutledge .       |           |
| 5,172,228 | * | 12/1992 | Israelsen ....... | 375/240.22|
| 5,398,069 | * | 3/1995  | Huang et al. .... | 375/240.22|
| 5,477,221 | * | 12/1995 | Chang et al. .... | 341/51    |
| 5,649,030 |   | 7/1997  | Normile et al. . |           |
| 5,799,110 | * | 8/1998  | Israelsen et al. | 382/253   |
| 5,889,562 | * | 3/1999  | Pau ............. | 382/239   |
| 5,889,891 | * | 3/1999  | Gersho et al. ... | 348/453   |
| 6,023,295 | * | 2/2000  | Pau ............. | 348/240.04|
| 6,108,381 | * | 8/2000  | Pau et al. ...... | 375/240   |

FOREIGN PATENT DOCUMENTS

| 0 314 018 A2 | 10/1988 | (EP) | ............................... H03M/7/30 |
| 687 111 A2   | 6/1995  | (EP) | ............................... H04N/7/24 |

OTHER PUBLICATIONS

V.S. Sitaram et al., "*Efficient Codebooks for Vector Quantization Image Compression With an Adaptive Tree Search Algorithm,*" IEEE Transactions on Communications, vol. 42, No. 11, Nov. 1, 1994, pp. 3027–3033.

C.W. Ku et al., "*Tree–Structure Architecture and VLSI Implementation for Vector Quantization Algorithms,*" International Symposium on Circuits and Systems, Institute of Electrical and Electronics Engineers, vol. 4, May 30, 1994, pp. 139–142.

(List continued on next page.)

*Primary Examiner*—Chris Kelley
*Assistant Examiner*—Gims Philippe
(74) *Attorney, Agent, or Firm*—Theodore E. Galanthay; Allen, Dyer, Doppelt Milbrath & Gilchrist, P.A.

(57) ABSTRACT

The memory requirement of MPEG decoders and SQTV/IQTV systems may be reduced by recompressing the MPEG decoded data stream before storing pixels in an external RAM. An efficient compression method for recompressing video picture data based on the tree-search vector quantization (TSVQ) is made more effective by optimizing the way the quantizer is chosen for quantizing the differences among adjacent pel vectors. This method is based on premultiplying a read-only table using quantized complexity measures relative to the centroids of the tree-like scheme used in the TSVQ processing. A plurality of precalculated tables of quantization of the prediction error of a physical parameter of blocks of digital data are produced. For each one of the regions in which a block is divided, the calculated and quantized complexity measure provides an address that selects the most appropriate precalculated table for quantizing the prediction error. The adaptive tree-search vector quantization method is implemented in a corresponding hardware architecture.

8 Claims, 11 Drawing Sheets

OTHER PUBLICATIONS

D.L. Neuhoff et al., "*On the Performance of Tree–Structured Vector Quantization*," Proceedings of the International Symposium on Information Theory, Institute of Electrical and Electronics Engineers, Jun. 24, 1991, p. 247.

D.F. Lyons et al., "*Reduced Storage Tree–Structured Vector Quantization*," Image and Multidimensional Signal Proceeding, Institute of Electrical and Electronics Engineers, vol. 5, Apr. 27, 1993, pp. 602–605.

* cited by examiner

ADAPTIVE TREE-SEARCH VECTOR QUANTIZATION IN MPEG2 DECODER

FIELD OF THE INVENTION

The present invention relates to the field of data processing, and more particularly, to video data processing which stores digital data in dedicated video memories for implementation of real time processing on the digital data, as performed in video decoders using the MPEG compression algorithm or in SQTV/IQTV systems.

BACKGROUND OF THE INVENTION

Reducing memory requirements are important, especially for those systems supporting decoding of the high definition television (HDTV) standard. For example, an MPEG-2 video decoder integrated system capable of decoding high definition sequences, as well as standard definition sequences, normally requires access to an external video memory (DRAM) of at least 80 Mbits through a common interface. Typically, in such an application, the video memory may be configured according to the following frame buffers. A bit buffer for compressed data is set according to the MPEG-2 standard at 9,500,000 bits. An I-frame buffer for the I-picture (Intra-picture) is decompressed in a 4:2:0 format and a P-frame buffer for the decompressed P-picture (Predicted-picture) is in a 4:2:0 format. In addition, a B-frame buffer for the decompressed B-picture (Bidirectionally Predicted Picture) is in a 4:2:0 format. Each frame buffer in the 4:2:0 format may occupy an amount of memory given by:

$$
\begin{aligned}
1920 \times 1080 \times 8 \text{ for the luma } Y &= 16{,}588{,}800 \text{ bit} \\
960 \times 540 \times 8 \text{ for the chroma } U &= 4{,}147{,}200 \text{ bit} \\
960 \times 540 \times 8 \text{ for the chroma } V &= 4{,}147{,}200 \text{ bit} \\
\text{total} \quad Y + U + V &= \overline{24{,}883{,}200} \text{ bit}
\end{aligned}
$$

Therefore, the actual total amount of memory requirement for high definition television decoding will be:

9,500,000+24,883,200+24,883,200+24,883,200=84,149,600 bits

By using fast synchronous memories such as SDRAM, decompression of the B-pictures can be optimized upon reception without storing them. This optimization reduces the external memory requirement to:

9,500,000+24,883,200+24,883,200=59,266,400 bits

In view that the B-buffer is implemented on chip, reduction of the external memory requirements is necessary to convert the scanning of each 8×8 block. This conversion is defined in the MPEG-2 compressed bitstream for each row of the picture (field or frame), as required by the video display processing. Such a conversion macrocell is commonly referred to as a MACROBLOCK TO RASTER SCAN CONVERTER.

Incorporated herein by reference in its entirety is European Patent Application No. 97830041.6, dated Feb. 6, 1997, which is assigned to the assignee of the present invention. This reference discloses an efficient tree-search vector quantization (TSVQ) technique for compressing digital video data to be stored in the external memory. This reduces the video memory requirement of the system. In practice, the memory required by the decoding system can be reduced by recompressing the pictures used as a reference for the prediction (I-, P- and B-pictures) after MPEG decompression, and before storing them in the external video memory. The same TSVQ compression technique is also useful in SQTV processors.

As previously described with respect to the above-referenced patent application, the effectiveness of a compression method based on the TSVQ technique is strongly influenced by the way the quantizer is chosen. The quantizer is used for quantizing the differences among the adjacent pel vectors. The present invention improves the effectiveness of the method described in referenced patent application by providing a more efficient way of selecting the quantizer, apart from other improving features.

As an illustrative example to highlight an object of the present invention, reference is made to the description of the MPEG-2 decoding system disclosed in the referenced patent application. The MPEG-2 decoding system utilizes a tree-search vector quantization technique for compressing digital video data to be stored in an external video memory. In particular, I is a digital picture represented by a matrix of M rows and N columns of pixels. I(y,x) is the pixel corresponding to row y and column x, and is coded with an integer number B of bits (binary digits). The I picture is separated into rectangular blocks having an R×C size (R rows and C columns). The maximum efficiency for the compression is obtained if R and C are chosen among the integer divisors of M and N, respectively.

The algorithm performs a compression of each block by exploiting only the data extracted from the block itself. The compression of each block is a reduction of the number of bits necessary for representing the block itself. This simplifies both access to the block in the stream of compressed data, and also the decompression of the block itself. The TSVQ compression mechanism exploits the correlation existing among adjacent pixels of a picture for reducing the number of bits necessary for a binary description of the picture itself. Considering a vector formed by J rows and K columns, the ideal effectiveness of the compression is obtained if J and K are chosen among the integer dividers of R and C, respectively. It is possible to approximate the value of a pixel vector by appropriately combining only the values of the pixels adjacent to it and forming a second pixel vector. This forms what is commonly referred to as a vector prediction.

It is therefore possible to reduce the amount of binary digits necessary for a digital representation of a picture by defining the prediction mechanism and by appropriately coding only a prediction error vector. This coding of the prediction error vector does not code each pixel. The more precise the vector prediction (and its components), the lower the entropy of the prediction error. That is, the number of bits necessary for coding the prediction error is lower.

In defining a scanning arrangement of the R×C block, for each J×K vector there exists another vector preceding it that may be used as the predictor of the vector itself. An exception is for the first one, which is not subject to any modification with respect to the values of its components. Let V (i . . . i+J−1, j . . . j+K−1),
   i=1, . . . , [R−J+1] and
   j=1, . . . , [C−K+1]

be the vector comprising the pixels contained in the rectangular area determined by the following coordinates: top left coordinates (i, j), top right coordinates (i, j+K−1), bottom left coordinates (i+J−1, j), and bottom right coordinates (i+J−1, j+K−1). With respect to the arrangement of FIG. 9, the rectangular area is defined as follows:

OV (1 ... J, 1 ... K), first scan vector
OV' (i ... i+J-1, 1 ... j+K-1),
   i=1, and
   j=1, 1+K, 2+K, C-K+1

The prediction error, E=V-V', is defined according to a scanning arrangement that is divided in regions so that each vector E belongs to only one region. The union of the regions forms the R×C block. A local complexity measure for each region is defined as the average value of the sum of the components of each vector E( ) in terms of its absolute value. Accordingly, j ranges between 1 and (C-K+1)/D, where D is a positive integer ranging between 1 and (C-K+1). Other measures could be used for determining the local complexity measure, such as the maximum value of the components.

A positive value is quantized with one of the G values stored in a table. The positive value represents the centroids of the areas in which the most general scalar statistic of the values have been divided. Such a partition minimizes the mean square error as compared to other possible partitions of the same statistic. Quantization table G is generated by using the Generalized Lloyd's Algorithm, which is well know to one skilled in the art.

Each component of the error prediction vector is divided by a quantized value $G^*$. In this manner, the entropy of the prediction error statistic is further reduced towards a mean value equal to 0. This step of the algorithm increases the efficiency of the next quantization step, while reducing the quantization error of the error vector E. The quantization error of the error vector E is scaled by the gain $G^*$, and is now referred to as $E^*$.

For example, if D=2, the region R×C is subdivided into two zones. In the first zone, the value G1 is calculated. Value G1 is substituted (i.e., quantized) with $G1^*$ and is used to scale the E vectors. The E vectors are calculated in the first zone. The same procedure is used for the second zone, which leads to a different value of G2. Once the calculated region $E^*$ is defined, the error vector is quantized. That is, the error vector is replaced with one of the H vectors stored in a table. The error vector represents the centroids of the areas in which the most general vector statistic of a picture has been partitioned. This partition minimizes the mean square error as compared to other possible partitions of the same statistic.

The quantization table H is generated through the Generalized Lloyd's Algorithm. An advantage of using a TSVQ compression technique derives from the fact that the quantization process terminates after a number of comparisons are equal to the logarithm in base 2 of H. The TSVQ compression method may be applied to each block in which the picture is divided, through the following operations:

1) coding of the unmodified first vector V (1 ... J, 1 ... K) of an R×C block by vectors of T×K dimensions;
2) selection and use of a scanning path of the R×C block by vectors of J×K dimension;
3) selection of a partition in regions of the scan;
4) selection and calculation of a measure of complexity for each region;
5) quantization of the measure through binary search and coding of the quantizer;
6) generation of a predictor vector of the current one to be quantized;
7) division of the prediction error by the quantized complexity measure;
8) quantization of the result of the division through binary search and coding of the quantizer; and
9) repetition of steps 4 to 8 using the path defined in step 2 for all the vectors of the block R×C, and for all the regions in which the block has been partitioned.

Steps 1) through 9) as previously listed for the TSVQ compression method are described and illustrated in greater detail in the following numbered sections. Each numbered section below corresponds with one of the steps listed in 1) through 9).

1) CODING OF THE UNMODIFIED FIRST VECTOR V (1 ... J, 1 ... K) OF AN R×C BLOCK. The R×C block is composed as follows:

| A(1,1) | A(1,2) | A(1,3) | A(1,4) | A(1,5) | A(1,6) | A(1,7) | A(1, C/K) |
|--------|--------|--------|--------|--------|--------|--------|-----------|
| A(2,1) | A(2,2) | A(2,3) | A(2,4) | A(2,5) | A(2,6) | A(2,7) | A(2, C/K) |
| A(3,1) | A(3,2) | A(3,3) | A(3,4) | A(3,5) | A(3,6) | A(3,7) | A(3, C/K) |
| ...    | ...    | ...    | ...    | ...    | ...    | ...    | ...       |
| A(R/J,1) | A(R/J,2) | A(R/J,4) | A(R/J,4) | A(R/J,5) | | | |
| A(R/J,6) | A(R/J,7) | | | | | | A(R/J, C/K) | where A is a vector composed of J×K pixels. The first vector A(1, 1) is coded without any modification, according to its original resolution by B bits.

2) SELECTION AND USE OF A SCANNING PATH OF THE R×C BLOCK BY J×K DIMENSION VECTORS. The scan selected for generating the prediction error and the relative vector quantization may be as follows:

| - first row,  | A(1,1), A(1,2)   | A(1,C/K)   |
|---------------|------------------|------------|
| - second row, | A(2,1), A(2,2)   | A(2,C/K)   |
| - third row,  | A(3,1), A(3,2)   | A(3,C/K)   |
| ...           |                  |            |
| - last row,   | A(R/J,1), A(R/J,2) | A(R/J, C/K) |

3) SELECTION OF A PARTITION IN REGIONS OF THE SCANNING. The scanning previously selected is further partitioned in regions that comprises a part of the prediction errors of the R×C region. Typically, symmetric partitions are preferred. The number of such partitions comprises between 1 and (C-K+1). For example, if D=2, then two partitions are obtained:

| FIRST REGION | SECOND REGION |
|---|---|
| A(1,1) A(1,2) A(1,3) A(1,4) A(1,C/2 * K) | // A(1, (C/2 * K) + 1) A(1, C/K) |
| A(2,1) A(2,2) A(2,3) A(2,4) A(2,C/2 * K) | // A(2, (C/2 * K) + 1) A(2, C/K) |
| A(3,1) A(3,2) A(3,3) A(3,4) A(3,C/2 * K) | // A(3, (C/2 * K) + 1) A(3, C/K) |
| ............................... | ............... |
| ............................... | ............... |
| ............................... | ............... |
| A(R/J,1) A(R/J,2) A(R/J,3) A(R/J,C/2 * K) | // A(R/J, (C/2 * K) + 1A(R/J, C/K) |

Other partitions are possible.

4) SELECTION AND CALCULATION OF A MEASURE OF COMPLEXITY FOR EACH REGION. The complexity measure may be defined as the average value of the sum of the absolute values of the components of each predictor error vector. These errors belong to the same region in which the measure of complexity is calculated. Alternative measures are possible. An example of an alternative measurement is to use the average value of the maximum value of the components of each prediction error vector.

5) QUANTIZATION OF THE MEASURE THROUGH A BINARY SEARCH AND CODING OF THE QUANTIZER. Considering the use of a quantization table formed by an integer number G of scalar values, such a table belongs to a set making H possible to select G in a different manner for region to region. Each of these numbers G represents the centroid of a well defined partition of the statistic for the measures of complexity, as calculated by the Generalized Lloyd's Algorithm. Assuming that they are disposed at the nodes of a binary tree, and that G=7, then:

|   |   | G4 | "00" |
|---|---|---|---|
|   | G2 |   |   |
|   |   | G5 | "01" |
| G1 |   |   |   |
|   |   | G6 | "10" |
|   | G3 |   |   |
|   |   | G7 | "11" |

The complexity measure calculated in step 4 is quantized in terms of G4, G5, G6 and G7. For example, assume that G is the value of the measurement. The differences (G−G2) and (G−G3) are then calculated, and it is assumed that the first difference is less than the second difference. The next step is to calculate (G−G4) and (G−G5). It is assumed that the second difference is less than the first difference. Therefore, G*=G5 is the value that better approximates G among those values available in the table. For the coding of G*, only two bits are necessary, such as 01 used in the example. The difference (G−Gi) may be calculated according to the L1 or L2 norms, or in a different way.

6) GENERATING A PREDICTION VECTOR FOR THE CURRENT ONE TO BE QUANTIZED. The prediction is of the spatial type, wherein the components of the prediction error vector are generated as sums and/or differences. These components may be weighted by appropriate coefficients corresponding to the pixels belonging to adjacent vectors. An example is illustrated below. For the prediction, use is made of the vector in the position that precedes the predicted one. For example, predictor A(1, 1) is used to predict A(1, 2), wherein A(1, 1) and A(1, 2) are two vectors with J=4 and K=1.

| A(1, 1) = P0 | A(1, 2) = Q0 |
|---|---|
| P1 | Q1 |
| P2 | Q2 |
| P3 | Q3 |

The prediction vector is equal to

| E( ) = Q0 - P0 |
|---|
| Q1 - P1 |
| Q2 - P2 |
| Q3 - P3 |

For each pixel Q of the block, the predictor to be adopted will be the pixel P in accordance with what was previously defined. It should be noted that such a predictor, following the previously illustrated scan order, has already been quantized and reconstructed. Therefore, it is not taken from the original picture. This allows for a better control of image quality, according to known ADPCM techniques.

7) DIVIDING THE PREDICTION ERROR BY THE QUANTIZED MEASURE OF COMPLEXITY. The predictor error E( ) belongs to the region wherein the measure G was calculated. Therefore, each component of E( ) is divided by the quantized measure G*, thus obtaining E*( ).

8) QUANTIZING THROUGH BINARY RESEARCH AND CODING OF THE QUANTIZER. It is assumed that the quantization table used is made up of H vectors, where each vector includes 4 integer components. Each of these vectors represents the centroid of a well defined partition of the prediction vector statistic, and are calculated through the Generalized Lloyd's Algorithm. Also, they are disposed at the nodes of a binary tree, with H equal to 15, illustrated as follows:

|   |   |   |   | H8 | "000" |
|---|---|---|---|---|---|
|   |   |   | H4 |   |   |
|   |   |   |   | H9 | "001" |
|   |   | H2 |   |   |   |
|   |   |   |   | H10 | "010" |
|   |   |   | H5 |   |   |
|   |   |   |   | H11 | "011" |
| H1 |   |   |   |   |   |
|   |   |   |   | H12 | "100" |
|   |   |   | H6 |   |   |
|   |   |   |   | H13 | "101" |

-continued

| | H3 | | |
|---|---|---|---|
| | | H14 | "110" |
| | H7 | | |
| | | H15 | "111" |

Notation:
H2 and H3 are sons of H1
H4 and H5 are sons of H2
H7 and H6 are sons of H3
H8 and H9 are sons of H4
H10 and H11 are sons of H5
H12 and H13 are sons of H6
H14 and H15 are sons of H7

A son vector is defined as a vector whose components correspond to the arithmetic mean of the homologous components of a corresponding parent vector. The scaled error predictor E*( ) is quantized through H8, H9, H10, H11, H12, H13, H14 and H15. For example, the difference [E*( )–H2] and [E*( )–H3] is calculated, and the distance (e.g., Norm I2) equals the sum of the squares of the differences among the components of the two vectors. The distance is also calculated between the vector E*( ) and H2, and between the vector E*( ) and H3.

Assuming the second difference is less than the first difference, the next step is to calculate the distance between E*( ) and H6, and between E*( ) and H7. Assuming the first difference is less than the second difference, then the distance between E*( ) and H12, and between E*( ) and H13 will be calculated. If the latter difference is less than the first difference, then H13 will be the quantized vector of E*( ). This is the best value of approximation among those available in the above mentioned table. For the coding of H13, only three bits 101 are necessary for the considered example.

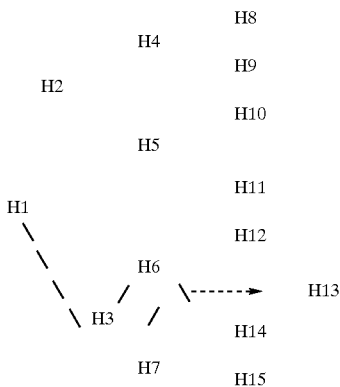

Only the vectors H8, H9, H10, H11, H12, H13, H14 or H15 can be the quantized vectors of E*( ), while the other vectors are used for determining which of those vectors are more similar to E*( ). Finally, as an alternative to the Norm I2, any other measurement of distance in the vectorial space may be utilized. For example, the Norm I1 is the sum of the modules of the differences among the homologous components of the two vectors. In this case, it is important to note that it is sufficient to have only one table for the chrominance and one table for the luminance because the error E*( ) has been scaled with G*.

FIG. 1 shows an MPEG2 video decoder which includes a TSVQ encoder and a TSVQ decoder for compression/decompression using a tree-search vector quantization for data stored in the video memory (DRAM). FIG. 2 shows the means for enabling or disabling the TSVQ recompression of data, depending on the functioning conditions as disclosed in the above referenced European patent application.

SUMMARY OF THE INVENTION

An object of the present invention is to provide a method and architecture that allows for a reduced requirement of video memory capacity.

Another object of the present invention is to quantize the luma and chroma components by premultiplication of the two basic look up tables by all the quantized values G* that the complexity measure may assume, and that are known in advance. An important simplification of the required hardware is achieved by making unnecessary the need for scaling the predictor error E( ). The prediction error E( ) was scaled in the system disclosed in the referenced European patent application. In practice, the multiplication of the look-up tables is considerably easier than performing a scaling division [E( )/G*] of the predictor error. Multiplication of the look-up tables constructs two different sets of read only values, with a first set for the luminance and a second set for the chrominance.

BRIEF DESCRIPTION OF THE DRAWINGS

The various objects and advantages of the invention will be even more evident through the following detailed description of an embodiment and by referring to the attached drawings, wherein.

DETAILED DESCRIPTION OF THE PREFERRED EMBODIMENTS

Due to the importance and widespread use of the MPEG standard, the ensuing description refers to application of the invention to MPEG coder/decoder systems without necessarily intending to limit the invention to this field of application. The same principles and architecture of the invention may also be utilized in other applications requiring a reduction in required memory capacity. For example, SQTV (Smart Quality Television) processors need to store entire pictures, or parts of them, during the decoding phase to implement adequate algorithms to correct or filter out disturbances, and/or implement high refresh rates not linked to the AC power line frequency. Therefore, the invention is useful for digital decoders and coders of pictures. Other applications, such as graphic cards and video image processors, are also applicable. More particularly, the invention is useful where there is a need for a temporary storage of a digitized picture of any format to be eventually viewed on at least part of a display screen.

The multiple quantizer tables (stored in a ROM) are defined for quantizing the prediction error for both the luminance and chrominance. A first multiplexer MUX1 selects which one should be used. The selection is dependent upon whether the luma or chroma is being compressed. In addition, the selection is dependent upon the quantized measure of the local complexity of the region considered.

In other words, the prediction error E( ) is not divided by G* as done according to the above referenced European Patent Application, but is quantized using a single preestablished table. The prediction error E( ) is quantized by using one of a plurality of tables. All the tables are derived from a theoretical one, wherein each value of the table has been premultiplied by G*. By considering, for example, that the luminance G* may assume four different values, the available precalculated tables will be four. The G* value will determine the selection of the table to be used among the four, and E( ) will be quantized in relation to a selected table.

Figure 3:
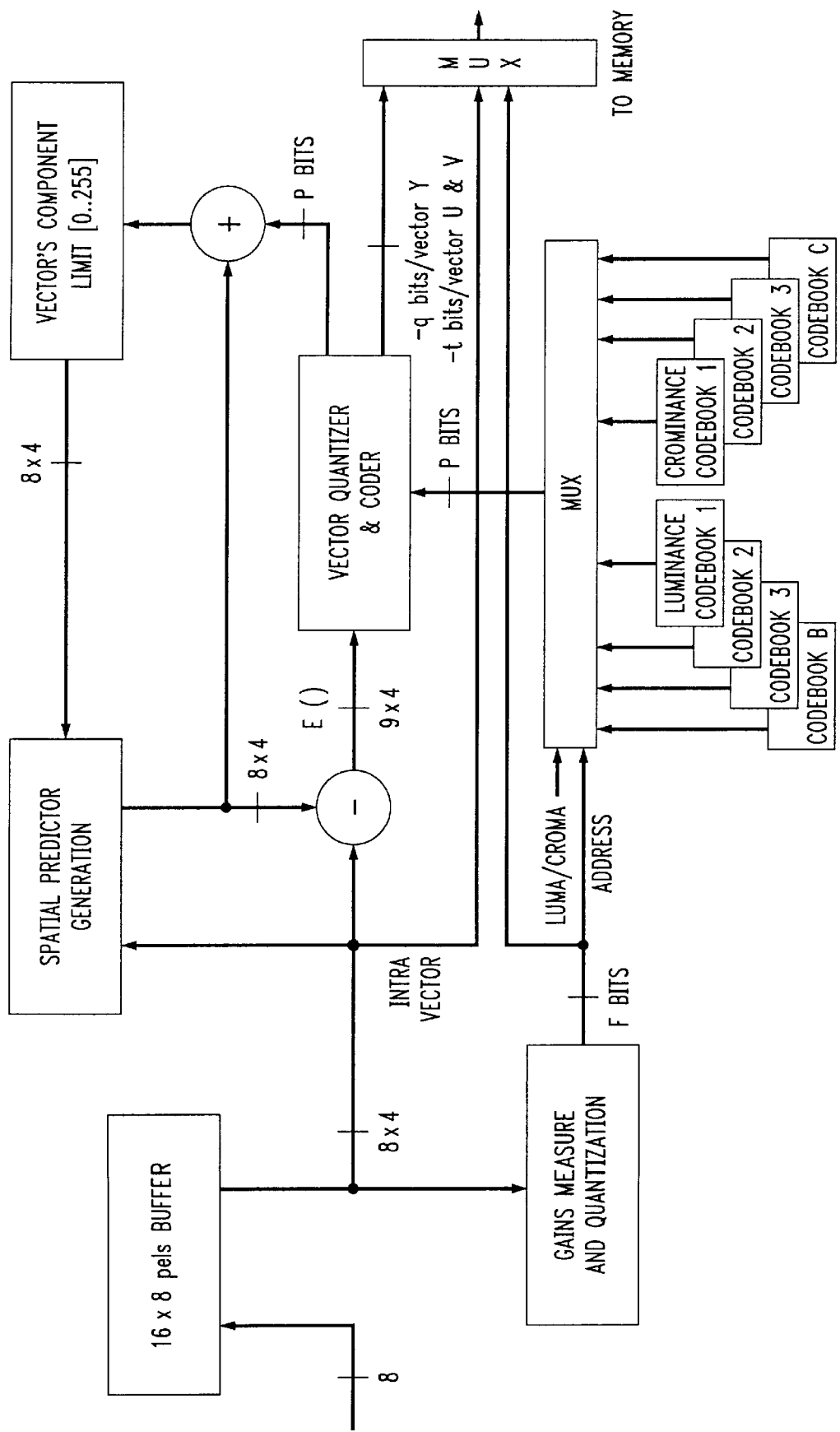
FIG. 3 is a block diagram of the TSVQ encoder that highlights the multiple quantizing tables for luma and chroma, respectively, as well as the quantizer block for the measure of local complexity, according to the present invention.

FIG. 3 depicts a block called gain measure and quantization that receives at an input a portion of the R×C region for which the measure is calculated and thereafter quantized. Accordingly, its output corresponds to a certain address. FIG. 3 also provides a circuit diagram scheme in which, besides a general view of the TSVQ encoder, the prediction and quantizing of the single pixels are detailed.

Figure 4:
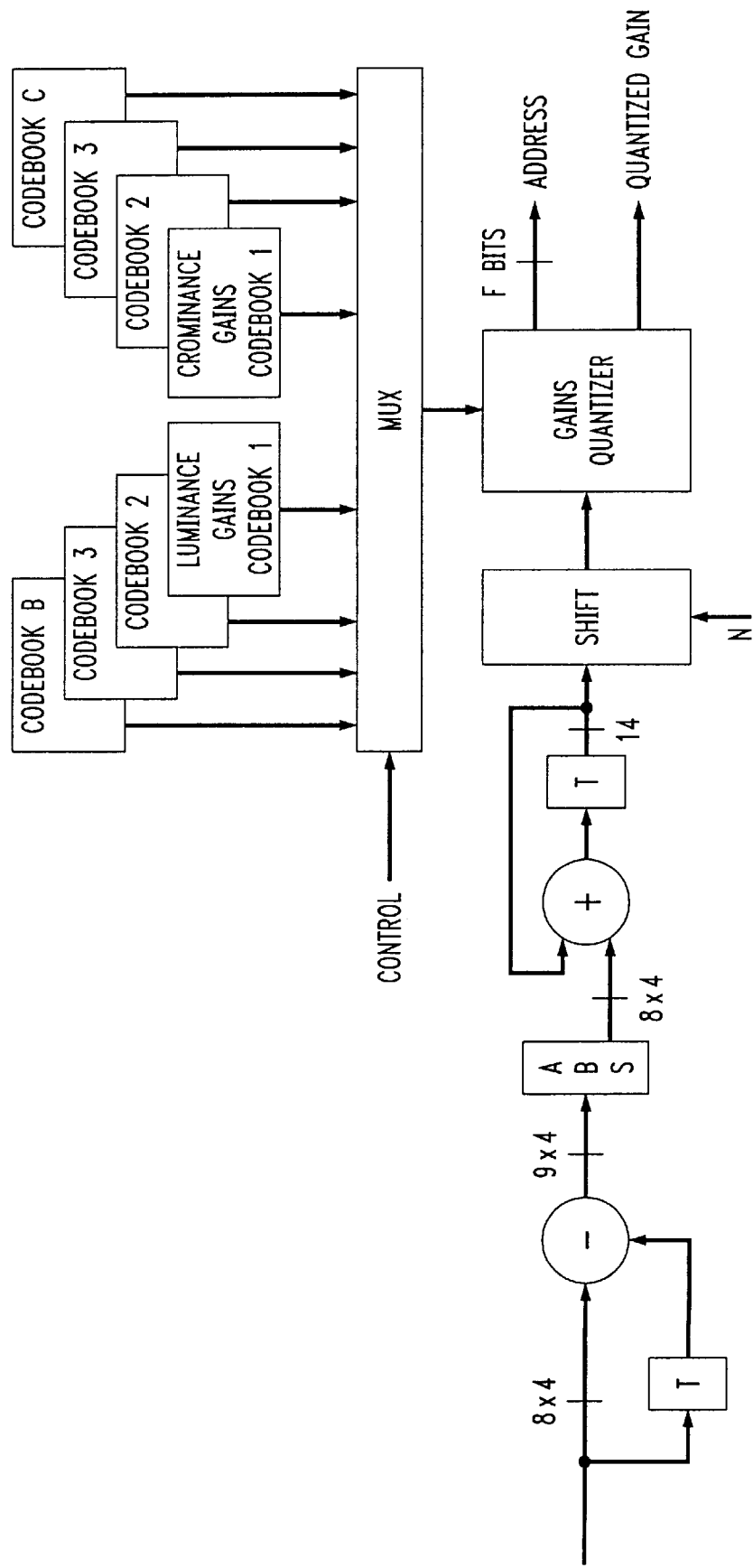
FIG. 4 shows the architecture of the vector estimator and quantizer of the local complexity measure, according to the present invention.
Figure 5:
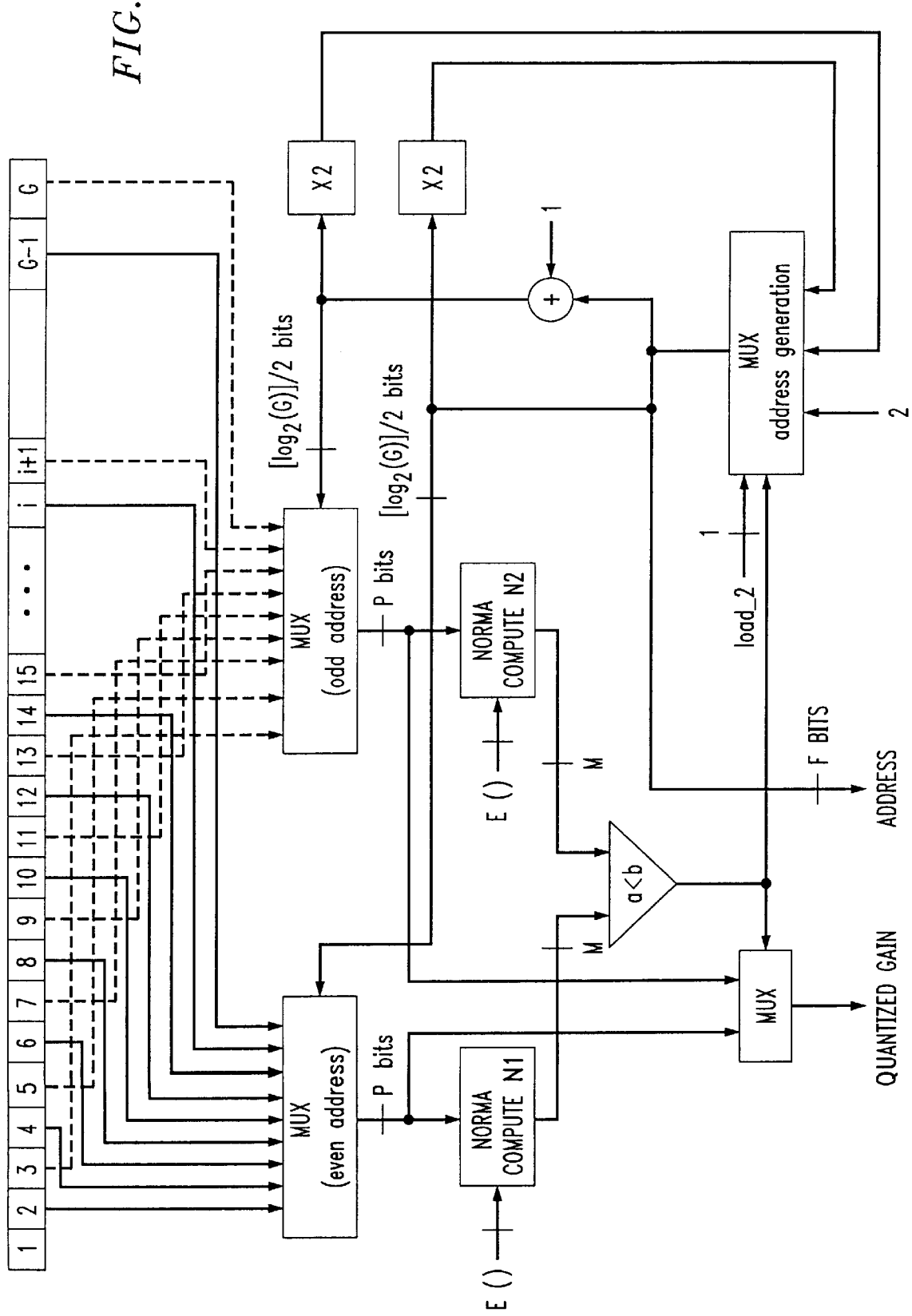
FIG. 5 shows the architecture of the scalar quantizer of the local complexity measure according to the present invention.
Figure 6:
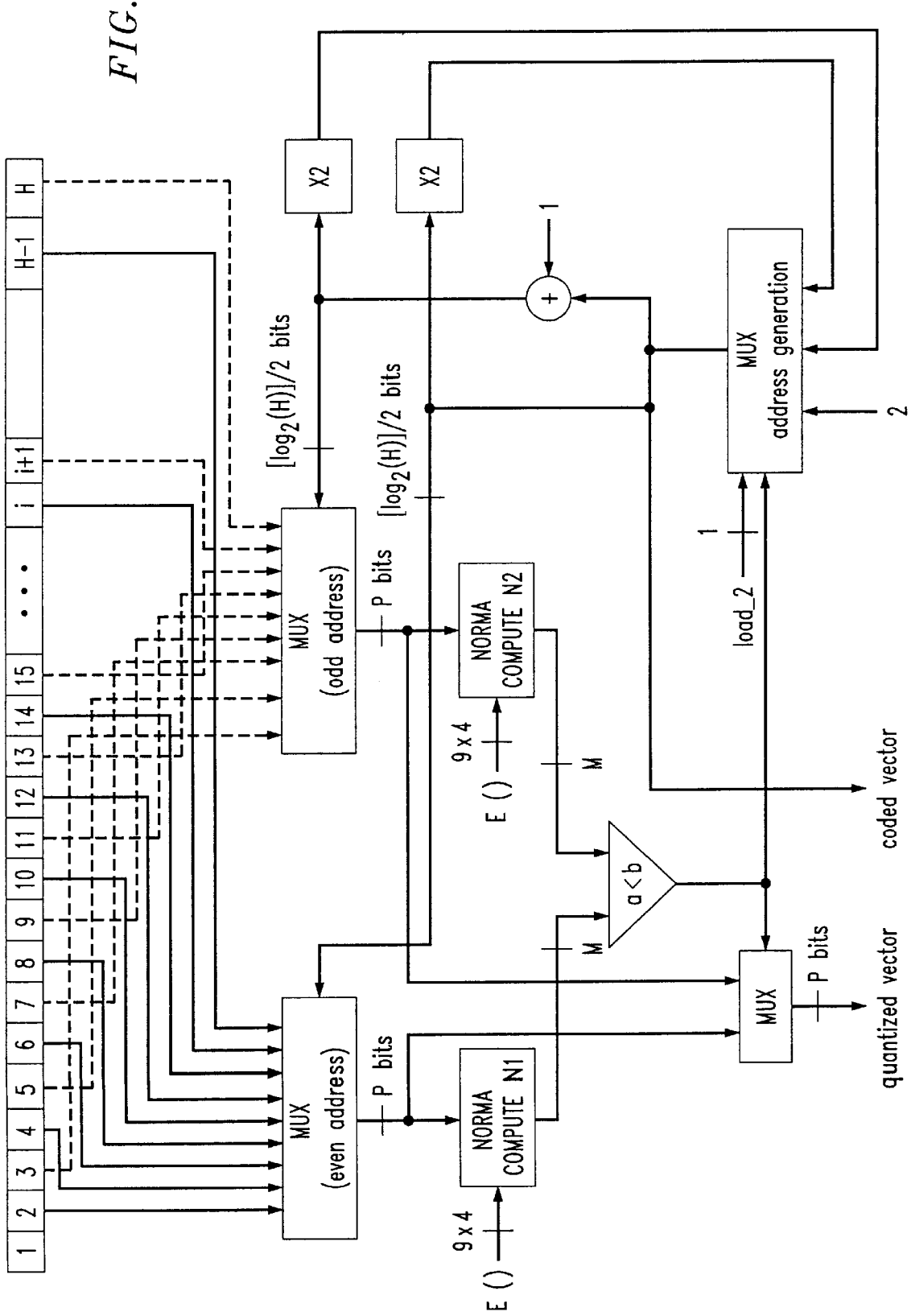
FIG. 6 shows the architecture of the vectorial quantizer of the nonscaled prediction error vector, according to the present invention.
Figure 7:
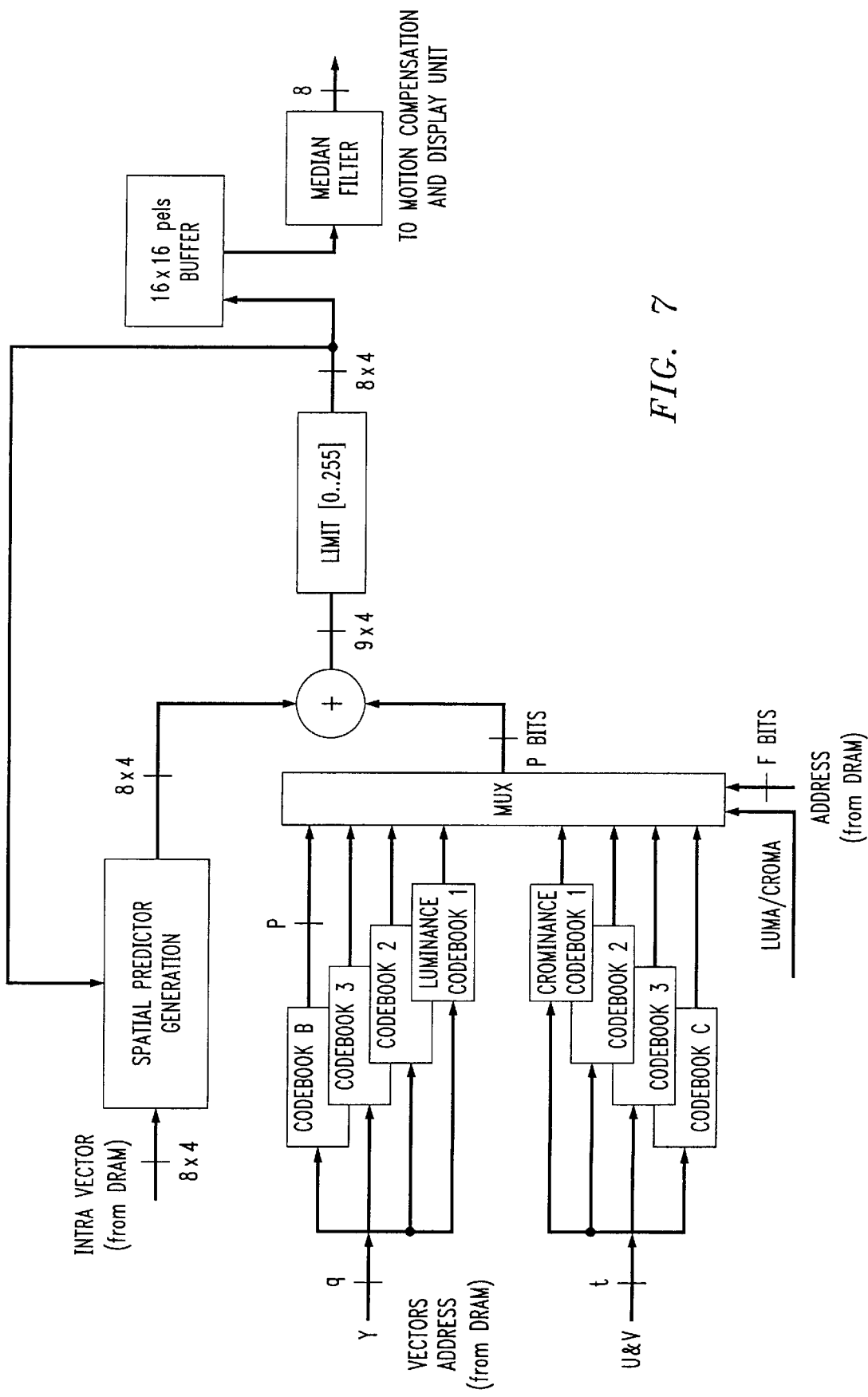
FIG. 7 shows the architecture of the TSVQ decoder of FIG. 2, according to the present invention.
Figure 10:
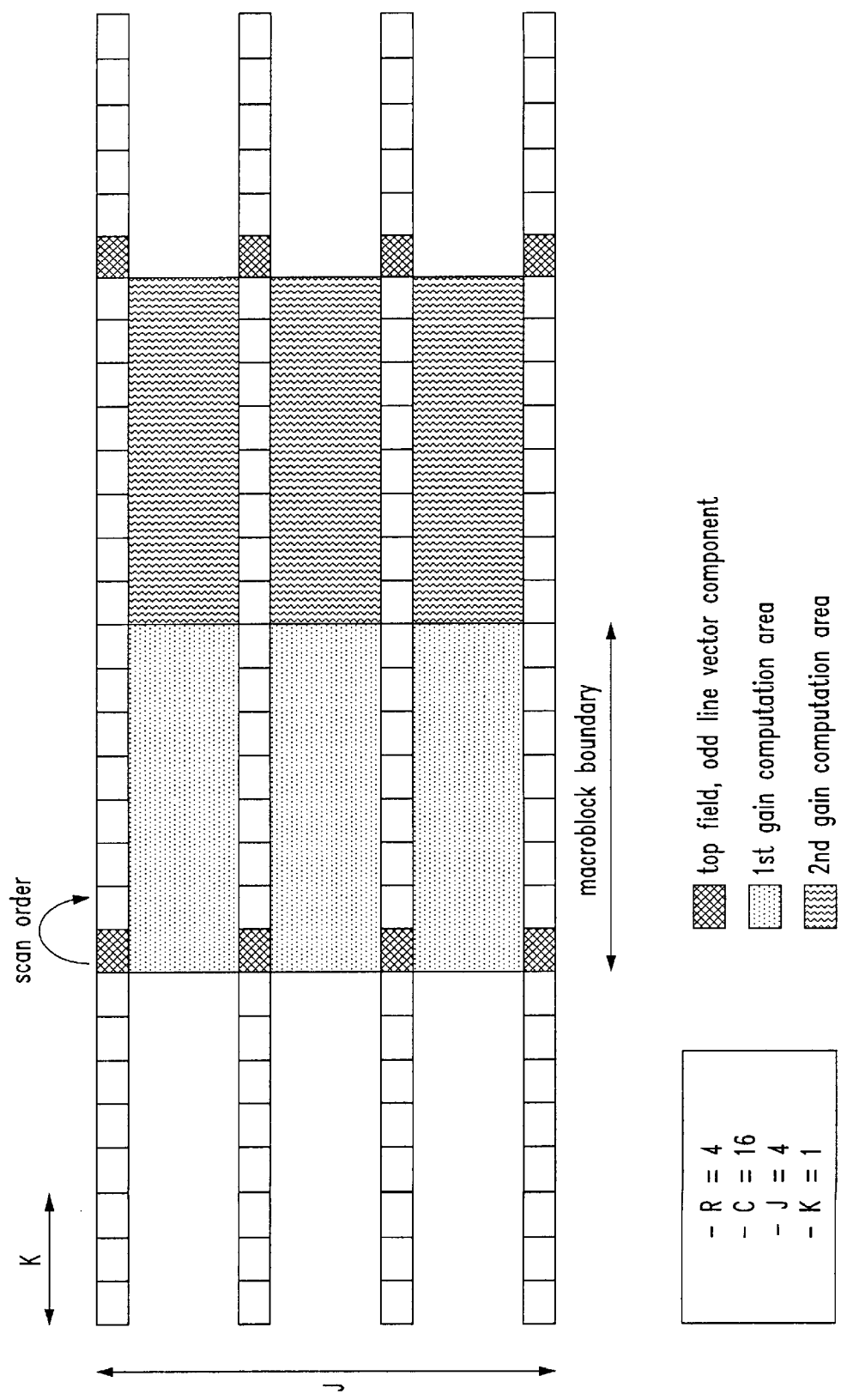
FIG. 10 shows an example of subdivision into regions of the scanning path, according to the present invention.

FIG. 4 shows an implementation of the vector estimator and quantizer of the local complexity measure, and FIG. 10 shows an example partition into two regions the block R×C for calculation of the respective gains. FIGS. 5 and 6 illustrate an embodiment of the quantizer of the gain measure and of the unscaled predictor error vector. The TSVQ decoder is illustrated in FIG. 7. In this figure, the presence of a pixel buffer (already decompressed) may be noted which allows construction of the working window of the median filter. This filter receives at an input an odd number of pixels and outputs the one with the mean value.

Figure 1:
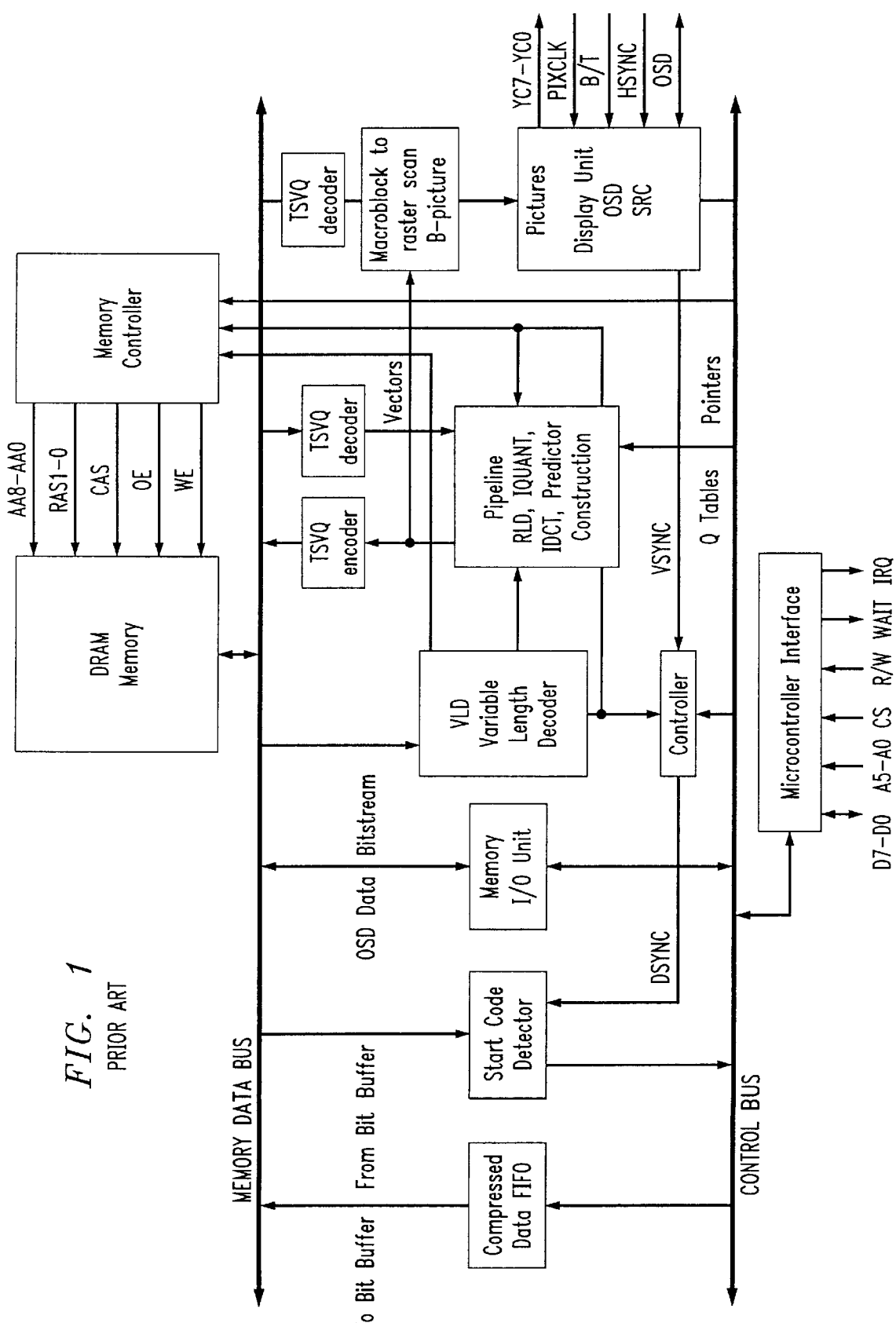
FIG. 1 is a block diagram of an MPEG2 video decoder including a TSVQ encoder and a TSVQ decoder, ccording to the prior art.
Figure 2:
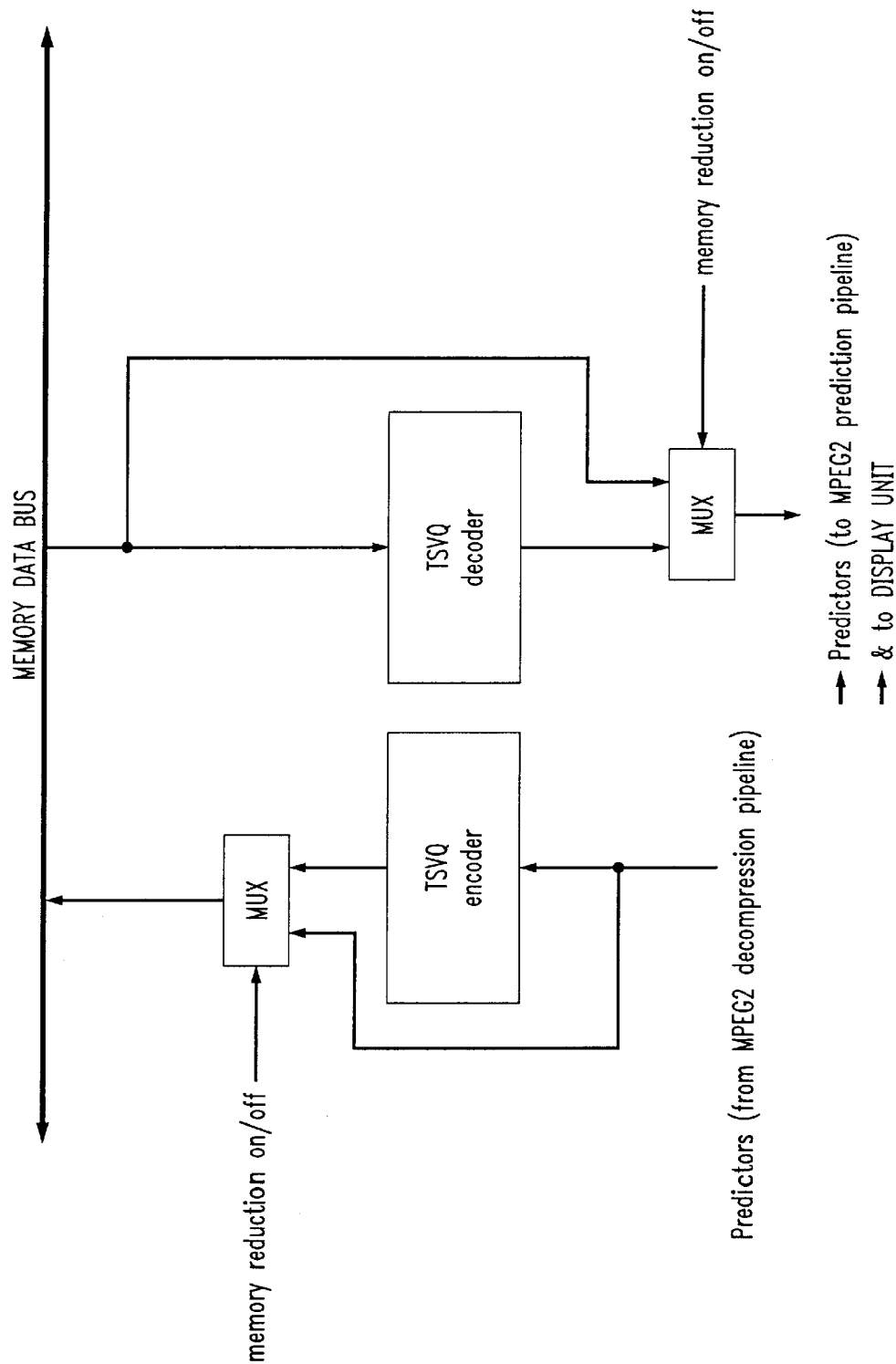
FIG. 2 shows means for enabling/disabling the TSVQ encoder and the TSVQ decoder, according to the prior art.
Figure 8:
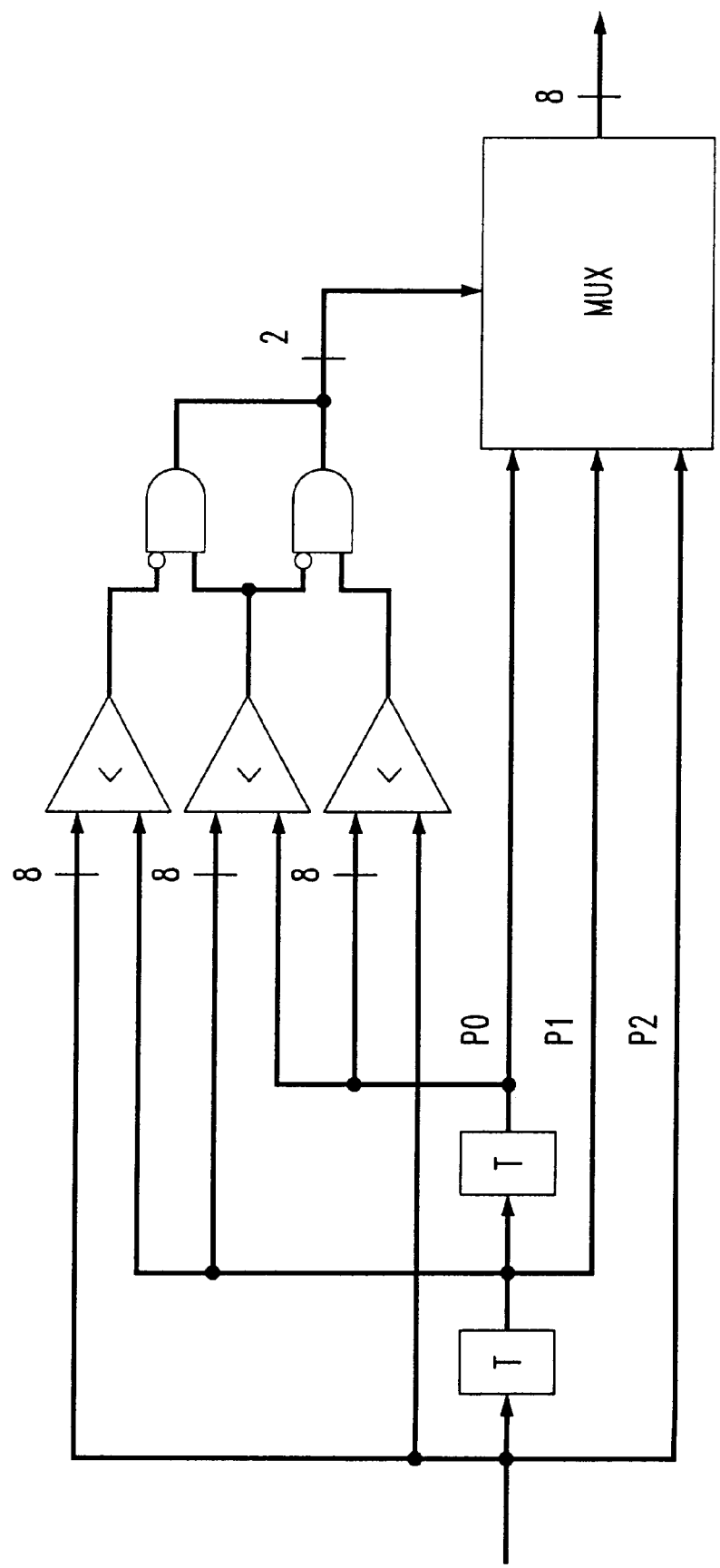
FIG. 8 shows the architecture of the median filter of FIG. 7, according to the present invention.
Figure 11:
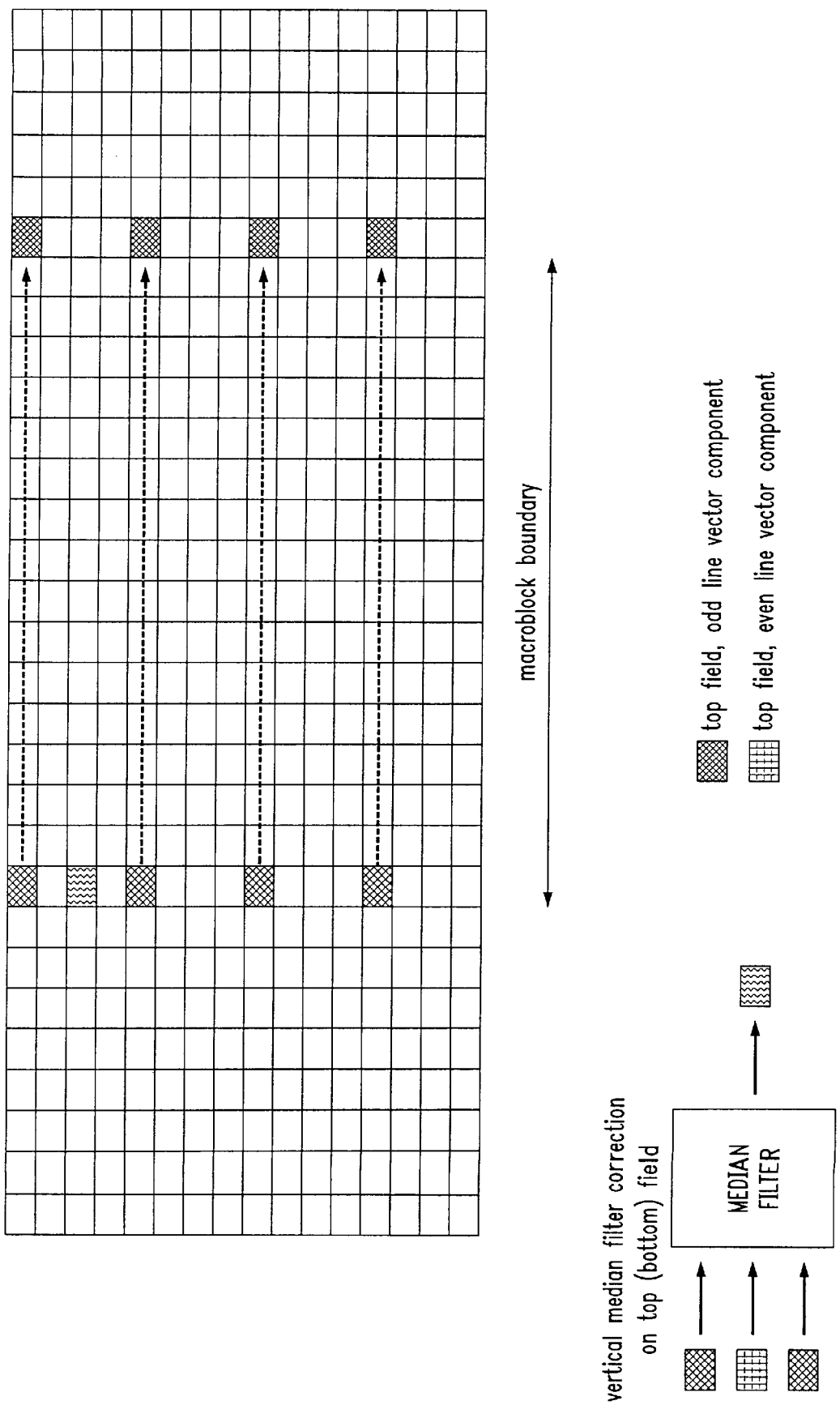
FIG. 11 shows an example of a working window of the median filter downstream of the TSVQ decoding, according to the present invention.

By considering, for example, a median filter to which three pixels values 10, 20, 15, respectively, are fed, its output will take the mean value 15. FIG. 8 shows a sample architecture of such a filter, while FIG. 11 is a sample working window on which the filter operates. FIG. 2 shows how the TSVQ decoder and the TSVQ encoder may be disabled or enabled through multiplexers which are driven by the internal control bus. This in turn is linked to the microprocessor that supervises the MPEG-2 device of the high level diagram of FIG. 1. A dynamic management of the external memory (DRAM) takes place, wherein an increase of memory free space is obtained by enabling the TSVQ encoder and the TSVQ decoder. This may be convenient if the external memory is greater than 32 Mbits, whereby the memory space remaining available may be used for other functions, such as graphics and teletext (OSD).

Figure 9:
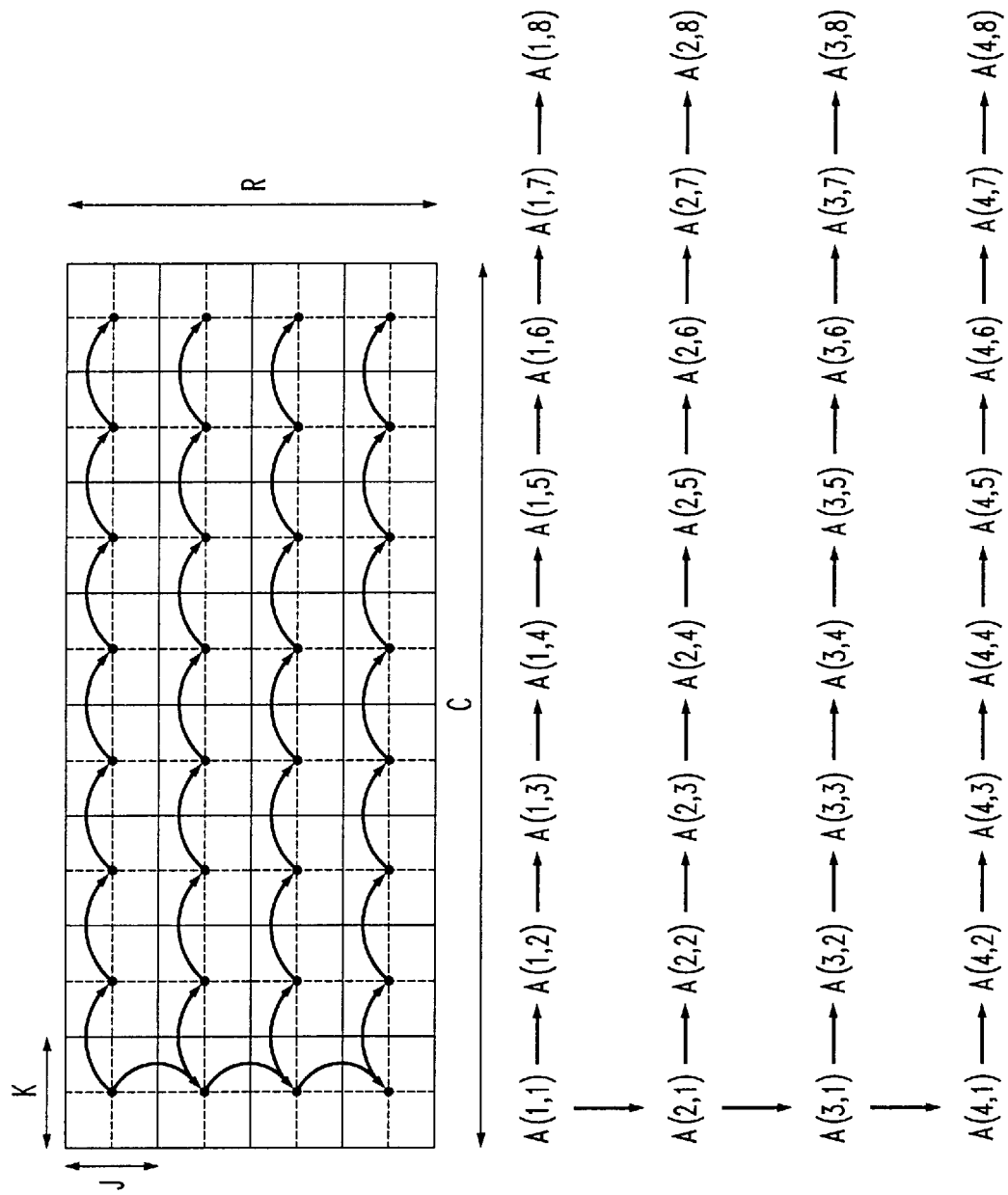
FIG. 9 shows an example of the scanning path of an R×C block by J×K vectors, according to the present invention.

An example Of compression with N bits per pixel is described in the following paragraphs. A R×C=4*16 block of pixels is provided after a motion compensation. An independent compression of each vector of pixels relative to an area J×K=4×1 of the picture is assumed and is included within the R×C block for the luma (as shown in FIG. 9), and within an R×C=4*8 block for the chroma. The total number of bits utilized for the compression of the block are:

$$8*J*K+(C-1)*N+F1+F2 \ldots +FD$$

where:
  8=number of bits used for the coding of each component of the first vector of the scan
  J=vertical dimension of the pixel vector
  K=horizontal dimension of the pixel vector
  N=bits used for coding each vector
  C=number of pixel vectors within the R×C block
  F1=bits used for coding the complexity measure within the region 1
  F2=bits used for coding the complexity measure within the region 2
  FD=bits used for coding the complexity measure of the D-th region
  For the case: J=4, C=16, N=7, K=1, F1=5, F2=4 and for the luminance we obtain a total of: 8*4*1+(16−1)*7+ 5+4=146 bit/4*16 macroblock
  For the case: J=4, K=1, C=8, N=8, F1=3, F2=2 and for the chrominance we obtain a total of: 8*4*1+(8−1)*8+3+ 2=93 bit/4*8 macroblock.

An example of compression of an MPEG macroblock is described in the following paragraphs. Each macroblock is made up of four 4*16 blocks of luminance, and of two 4*8 blocks of chrominance. Each macroblock is coded with a number of bits equal to:

$$\underset{\text{luma}}{(2*16*8*8)} + \underset{\text{chroma}}{(2*8*8*8)} = 3{,}072 \text{ bit}$$

In each 1,920×1,080 frame, there are 8,100 macroblocks:

$$3{,}072 \times 8{,}100 = 24{,}883{,}200 \text{ bits}$$

By considering a 7 bit/vector compression for the luminance and an 8 bit/vector compression for the chrominance, the memory requirement becomes:

$$\underset{\text{luma}}{(2*2*146)} + \underset{\text{chroma}}{(93*2*2)} = 956 \text{ bits}$$

Therefore, each frame occupies:

$$956 \times 8{,}100 = 7{,}743{,}600 \text{ bits}$$

The compression factor per macroblock obtained is equal to about 3,2.

By taking into account the above relationships, it is possible to reach the target of a 32 Mbit capacity by assuming the compression with the above computed factor for the decompressed I and P pictures. This result is attained by recompressing the I and P pictures after their MPEG decompression and before they are stored in the external memory. They will be then decompressed when they are read from the external memory, as depicted in the functional block diagram of FIG. 1.

The compression is performed on the 4*16 block as output from the I-DCT and motion compensation pipeline, according to an adaptive DPCM scheme. In particular, for the 4*16 blocks of luminance, which are subdivided in 4*1 vectors, a 7 bits/vector compression is selected. For the 4*8 blocks of chrominance, which are subdivided in 4*1 vectors, an 8 bits/vector compression is selected. Thus, the memory requirement becomes:

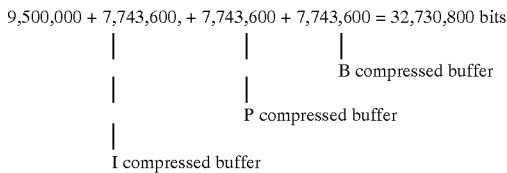

FIG. 2 shows means for enabling/disabling the TSVQ encoder and the TSVQ decoder, according to the prior art. The TSVQ encoder feeds the compressed data stream to a second input of a multiplexer of which there exists the same input datum of the TSVQ encoder. Using a configurable control signal of a microprocessor coupled to the MPEG2 decoder, as shown in FIG. 1, it is possible to condition the multiplexer for selecting one or the other of its two inputs to use or exclude the TSVQ compression. The same arrangement is also implemented in the decoder. The exclusion of the TSVQ encoder also implies that of the TSVQ decoder. A dynamic management of the external memory is implemented and, therefore, an increase or decrease of the free memory space is achieved by enabling or disabling the TSVQ encoder and the TSVQ decoder.

FIG. 3 is a block diagram of the TSVQ encoder that highlights the multiple quantizing tables for luma and chroma, respectively, as well as the quantizer block for the measure of local complexity, according to the present invention. Apart from providing a general view of the encoder, FIG. 3 also details the prediction and quantization loop of the single pixel vectors. It should be noted how the two tables of quantizers optimized for luma and chroma compression are defined. A multiplexer selects which of the tables should be used, depending on whether the chroma or the luma is being compressed, and depending on the local complexity measure.

The input buffer with a memory capacity of 16×8 pixels (each coded with 8 bits), for example, stores the block to be separated into vectors, e.g., vectors of 4×1 pixels. A gain measure and quantization block calculates for the considered region the multiplexer control datum to select the most appropriate table. The vector is then sent to a differential stage which determines the difference between the source and prediction vector. The resulting prediction error vector is then quantized by the block of FIG. 6. Referring to FIG. 6, the ROM address that contains the quantized vector is then sent to the DRAM memory. The quantized vector read from such an address is sent to a unit that limits the modules of its components between 0 and 255.

Therefore, the relative output feeds the block that generates the predictor for the next vector to be quantized. This block implements a linear correction of the vector components received at its input. For example, each component is multiplied by a factor alpha, which may be different for each component. Furthermore, alpha is a positive integer number greater or equal to zero. Finally, the starting vector of the scan is sent unmodified to the DRAM, and thus is recorded with full precision.

FIG. 4 shows the architecture of the vector estimator and quantizer of the local complexity measure, according to the present invention. A sample implementation of a circuit that calculates the mean absolute value of the sum of the differences between the same components of pairs of vectors belonging to the scanned region is shown in FIG. 4. In particular, the subtractor calculates the difference among the same components of the vectors. Thereafter, the absolute value is determined, followed by the calculation of the sum of the components for all the vectors that belong to the region under consideration. By a simple shift operation, the mean value is obtained, which is then fed the quantizer block. The block is initialized through a multiplexer with the information stored in one of the ROM tables. This multiplexer is driven by a control signal. The quantizer outputs a control signal which permits the selection of the most appropriate table, as depicted in FIG. 3.

FIG. 5 shows the architecture of the scalar quantizer of the local complexity measure according to the present invention. FIG. 6 shows the architecture of the vectorial quantizer of the nonscaled prediction error vector, according to the present invention. FIG. 5 also illustrates an embodiment of the scalar quantizer of FIG. 4. FIG. 6 shows the vectorial quantizer of the prediction error of FIG. 3. Such a vectorial quantizer is described in detail in the following paragraphs, with the description of the scalar quantizer of FIG. 5 being similar. The ROM is depicted at the top of both figures. Each address in the ROM contains a stored vector. This ROM is initialized by selecting a table using the address generated by the circuit of FIG. 4. H is the number of the ROM addresses. The implemented quantizing algorithm will output the quantized vector and the address of the memory cell that contains it after a number of comparisons. The number of comparisons is equal to the logarithm in base 2 of H.

All the ROM cells corresponding to the even addresses are linked to the MUX (even address), whereas those corresponding to the odd addresses are linked to the MUX (odd address). The outputs of the two multiplexers respectively feeds the NORM COMPUTE blocks that calculate the sum of the squares of the differences among the components of the two vectors present at their respective inputs. Alternatively, the blocks can calculate the sum of the absolute values of the differences among the components.

The outputs of the two blocks that calculate the norm feed a comparator that determines which of the two norms is greater. The resulting signal drives the MUX (address generation) to generate the corresponding even ROM address. If the norm between the prediction error vector (see FIG. 3) and the vector read from the ROM at the even address is lower than the norm between the prediction error vector and the vector read from the odd ROM address, then, for the next iteration of the algorithm, the address that drives the MUX (even addresses) multiplied by two will be used. Otherwise, the address that drives the MUX (odd addresses) multiplied by two will be used. These addresses are fed to the input of the address generation MUX, plus the initial address 2 used for the first iteration. The MUX is controlled by the output of the comparator, and by the initialization signal which establishes the use of the value 2 as the initial address value of the ROM address for each search cycle. The MUX output is used to drive the MUX (even address), whereas the other MUX (odd address) is driven by the same output, incremented by 1, thus accessing the odd addresses of the ROM.

For instance, if H=15, then after four iterations, the architecture of the invention will provide both the quantized and the coded vector. Referring to the example already described above:

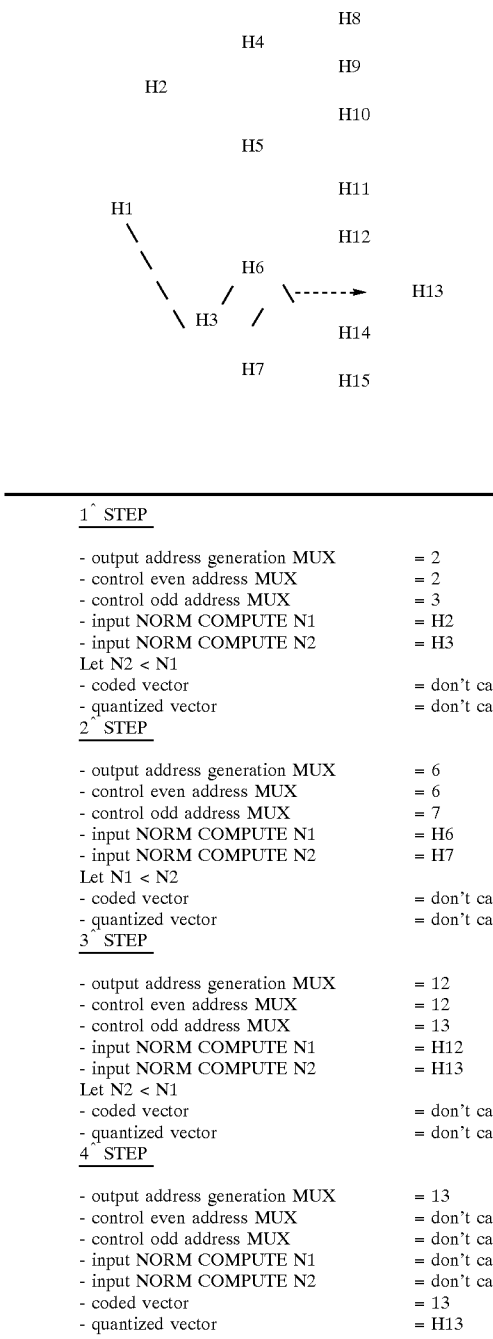

| 1^ STEP | |
|---|---|
| - output address generation MUX | = 2 |
| - control even address MUX | = 2 |
| - control odd address MUX | = 3 |
| - input NORM COMPUTE N1 | = H2 |
| - input NORM COMPUTE N2 | = H3 |
| Let N2 < N1 | |
| - coded vector | = don't care |
| - quantized vector | = don't care |
| 2^ STEP | |
| - output address generation MUX | = 6 |
| - control even address MUX | = 6 |
| - control odd address MUX | = 7 |
| - input NORM COMPUTE N1 | = H6 |
| - input NORM COMPUTE N2 | = H7 |
| Let N1 < N2 | |
| - coded vector | = don't care |
| - quantized vector | = don't care |
| 3^ STEP | |
| - output address generation MUX | = 12 |
| - control even address MUX | = 12 |
| - control odd address MUX | = 13 |
| - input NORM COMPUTE N1 | = H12 |
| - input NORM COMPUTE N2 | = H13 |
| Let N2 < N1 | |
| - coded vector | = don't care |
| - quantized vector | = don't care |
| 4^ STEP | |
| - output address generation MUX | = 13 |
| - control even address MUX | = don't care |
| - control odd address MUX | = don't care |
| - input NORM COMPUTE N1 | = don't care |
| - input NORM COMPUTE N2 | = don't care |
| - coded vector | = 13 |
| - quantized vector | = H13 |

Besides providing a general view of the TSVQ decoder, FIG. 7 shows the prediction loop for decoding the pixel vector that follows the current one. A way of defining the two quantizing tables optimized for luma and chroma compression are to be noted. A multiplexer selects which one must be used, depending on whether the luma or the chroma are being decompressed, and as a function of the address that codes the local complexity estimate of the region considered. The coded prediction error vector read from the DRAM is used as a ROM address containing the codebook. The read vector is then sent to an adder stage which sums it to the vector generated by the SPATIAL PREDICTOR GENERATION block. The block may implement a linear correction on the input vector. This sum is sent to a unit that limits the modules of its components between 0 and 255. The output of this unit feeds the block for the generation of the predictor for the next vector to be dequantized.

Finally, the same INTRA vector, which is the starting vector of the scan, is read from the DRAM memory to initialize the decoding. The reconstructed vector is stored in a buffer of 16×16 pels, from which data are read for generating the working window shown in FIG. 11. This window operates the median filter described in FIG. 8. FIG. 7 shows the architecture of the TSVQ decoder of FIG. 2, according to the present invention. A scheme of a median filter comprises three comparators and a multiplexer in its basic structure. The delay lines T permit access to the pels, which subsequently feed the comparators. The comparators define which one is the mean value pixel, by controlling the multiplier that selects the mean value pixel.

As will be evident to a person skilled in the art, the invention is equally useful to reduce the memory requirement of video data streams in different processing systems besides MPEG coding/decoding systems. Such systems include, for example, SQTV (or IQTV) processors. The invention may also be utilized in coding/decoding systems of data blocks relative to non-video information that may be conveniently coded in terms of vectors and compressed through a technique of vectorial quantization. The technique of vectorial quantization may be obtained by means of an architecture of the invention as that shown in FIGS. 5 and 6. Here, a TSVQ algorithm is used in an acquisition and decoding phase to reduce the memory requirement of the buffers in which the information must be to temporarily stored because of applicable processing needs. In particular, the improved TSVQ compression method and its architecture can be successfully used, according to the invention, in a video processor SQTV (or IQTV) of the type described in the referenced European patent application.

What is claimed is:

1. A method for reducing a memory requirement for temporarily storing a stream of digital data blocks in a coding/decoding system of information transferable by blocks, such data being compressed and coded by blocks through a tree-search vector quantization (TSVQ) and stored in a memory, where a subsequent reading phase decompresses the data by reconstructing the coded and compressed digital data blocks, the method comprising the steps of:

a) fixing a certain scan path of each data block R (rows)×C (columns) of the stream of digital data blocks to be separated into vectors of preestablished dimensions;

b) coding a first vector of a scan of a digital data block in an unmodified manner;

c) partitioning in one or more regions the scanning of a generated R×C data block;

d) selecting and calculating a complexity measure for each region as a mean value of a sum of absolute values of differences among corresponding components of adjacent vectors of the scanning, and belonging to the region;

e) quantizing according to a binary tree-search in a table of quantized values of the complexity measure by coding a corresponding address and using the address for controlling a multiplexer selecting a plurality of tables of quantized vectors, sending the address to the multiplexer that conveys a properly compressed value to the memory;

f) generating a predictor vector of the current one to be quantized, as a replica of a last decoded vector according to scanning and calculating of a prediction error vector;

g) quantizing according to a binary tree-search in a read only table of quantized vectors the prediction error vector, the table being selected among the plurality of tables of quantized vectors by the address of the quantized measure, coding the address of the table and sending it to a multiplexer that subsequently conveys a compressed value to the memory;

h) adding components of a vector read from the selected table of quantized vectors to the vector replica of the vector previously decoded, generating a prediction vector for a next vector to be coded according to the scanning path and the selected region;

i) repeating steps d) through h) following the scanning path for all the regions that make up the R×C data block, and for all the scanning vectors of each input data block;

j) premultiplying a read-only table using quantized complexity measures relative to centroids of a tree-like scheme used for the search, and producing as many precalculated tables for quantizing a prediction error of a physical parameter (luma, chroma) of the digital data block; and k) quantizing the prediction error using one of the precalculated tables selected by an address generated by estimating and quantizing a complexity measure of each one of the regions in which the R×C block is divided.

2. The method according to claim 1, wherein the block of input data is an R×C block of pixels of a video picture and physical parameters are the luminance (luma) and the chrominance (chroma).

3. The method according to claim 1, wherein the memory comprises a random access memory (RAM).

4. An MPEG-2 video decoder, interfacing with a control bus and a memory data bus through which video data are written on and read off respective memory buffers external to a core of the MPEG-2 video decoder, the MPEG-2 video decoder comprising:

a memory having one or more buffers for video bits;

a first-in-first-out (FIFO) buffer for data acquisition and writing of compressed data in a respective buffer of said memory;

a picture starting code detecting circuit;

a control circuit for synchronizing said picture starting code detecting circuit;

a bi-directional buffer for on-screen-data-display;

a variable length decoder for a compressed input data stream;

an MPEG-2 decompression pipeline for data decoded by said variable length decoder, and comprising a run length decoding stage, an inverse quantizer circuit, an inverse discrete cosine transform processor, and a predictor value generating circuit;

a conversion circuit for a current B-Picture upstream of a display unit;

a coding and recompressing circuit functioning according to a tree-search vector quantization algorithm for recompressing decompressed I and P pictures, and coding the respective data to be stored in respective buffers of said memory;

a decoding and decompressing circuit for stored data read from respective buffers of said memory generating a stream of decoded and decompressed data relative to the I and P pictures;

means for motion compensation of B-pictures and for conversion;

said coding and recompressing circuit further comprising a buffer for the acquisition of blocks of input data, separating the block of input data in decomposition vectors of predefined dimensions (J×K) and in an initial vector;

a differentiating stage receiving through a first input the decomposition vectors of the block of input data and through a second input prediction vectors, and outputting prediction error vectors;

a vector quantizing and coding circuit receiving through an input the prediction error vectors output by said differentiating stage and using at least two distinct tables of quantized vectors, respectively optimized for luma and chroma compression;

a circuit for automatically selecting the at least two distinct tables of quantized vectors, said circuit comprising a first multiplexer, a limiting circuit, a generator circuit of a predictor vector receiving through a first input a quantized vector whose components are limited by the limiting circuit, and through a second input a first decomposition vector of an R*C block scan present at an output of the input buffer and generating the prediction vector that is sent to a second input of said differentiating stage;

said vector quantizing and coding circuit further comprising two distinct sets of tables of quantized prediction errors, each obtained by multiplying a relative table of quantized prediction errors by each one of a plurality of predefined quantized measures of complexity;

a second multiplexer;

a stage for measuring a complexity or gain of each region and quantizing the measure through a binary tree-search scheme producing an address of a respective table containing a quantized vector to store through said second multiplexer in a respective buffer of external memory with an address of the quantized value of the local complexity measure together with the first scanning vector, and driving the selection of precalculated tables through said first multiplexer; and an adder stage receiving through a first input the prediction vector produced by the generator circuit of a predictor vector, and receiving through a second input the vector output by the first multiplexer, which is fed by the plurality of vectors selectively read from the tables, and having an output coupled to the input of the limiting circuit;

the output of the limiting circuit feeding a pixel stream through the buffer, said MPEG2 decompression pipeline, and said converting block.

5. An MPEG-2 video decoder according to claim 4, wherein said recompression and coding circuits comprise multiplexer means for enabling and disabling said recompression and coding circuits for a dynamic management of a compression rate of the digital data stream to be stored in said memory.

6. An MPEG-2 video decoder according to claim 4, wherein said decoding and decompression circuits comprises multiplexer means for enabling and disabling said decoding and decompression circuits for a dynamic management of a compression rate of the digital data stream to be stored in said memory.

7. An MPEG-2 video decoder according to claim 4, wherein said memory is external.

8. An MPEG-2 video decoder according to claim 4, wherein said memory comprises a dynamic random access memory (DRAM) device.

* * * * *